(12) United States Patent
Yang et al.

(10) Patent No.: US 8,866,404 B2
(45) Date of Patent: Oct. 21, 2014

(54) BACKLIGHT MODULE AND DISPLAY APPARATUS

(75) Inventors: Xiang Yang, Shenzhen (CN); Xin-Ming Gao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 514 days.

(21) Appl. No.: 13/260,327

(22) PCT Filed: Jun. 23, 2011

(86) PCT No.: PCT/CN2011/076182
§ 371 (c)(1),
(2), (4) Date: Sep. 25, 2011

(87) PCT Pub. No.: WO2012/167453
PCT Pub. Date: Dec. 13, 2012

(65) Prior Publication Data
US 2012/0313542 A1    Dec. 13, 2012

(51) Int. Cl.
*H05B 37/02* (2006.01)
*H05B 33/08* (2006.01)

(52) U.S. Cl.
CPC ........ *H05B 33/0815* (2013.01); *H05B 33/0824* (2013.01); *Y02B 20/346* (2013.01)
USPC .......................................... 315/291; 315/307

(58) Field of Classification Search
CPC ........... H05B 41/2828; H05B 41/2821; H05B 33/0827; H05B 33/0824; Y02B 20/346
USPC .................................. 315/291–308; 345/102
See application file for complete search history.

(56) References Cited

U.S. PATENT DOCUMENTS

| | | | |
|---|---|---|---|
| 2005/0226005 A1* | 10/2005 | Yang ............................. | 362/634 |
| 2006/0255753 A1 | 11/2006 | Sawada et al. | |
| 2007/0236155 A1 | 10/2007 | Kao et al. | |
| 2008/0106505 A1 | 5/2008 | Chou | |
| 2010/0239303 A1* | 9/2010 | Matsumoto ..................... | 399/88 |

FOREIGN PATENT DOCUMENTS

| | | | |
|---|---|---|---|
| CN | 2884777 Y | | 3/2007 |
| CN | 101038398 A | | 9/2007 |
| CN | 101079237 A | | 11/2007 |
| CN | 101923841 A | * | 12/2010 |
| CN | 101950541 A | | 1/2011 |
| CN | 101964176 A | | 2/2011 |
| CN | 102074214 A | | 5/2011 |
| EP | 2607948 A1 | * | 6/2013 |

* cited by examiner

*Primary Examiner* — Jimmy Vu
*Assistant Examiner* — Amy Yang
(74) *Attorney, Agent, or Firm* — Mark M. Friedman

(57) ABSTRACT

The present invention provides a driving circuit, a backlight module and a display apparatus using the same. The driving circuit comprises a first inductor, a second inductor, a first power switch, a second power switch, a driving circuit unit and a push-pull circuit. The first inductor and the second inductor are connected between the light-emitting diodes and a power supply. The first power switch is connected between the first inductor and the light-emitting diodes. The second power switch is connected between the second inductor and the light-emitting diodes. The push-pull circuit is connected to the first power switch and the second power switch. The driving circuit unit is connected to the push-pull circuit. An electrolytic capacitor or a capacitor having high capacitance can be omitted in this invention.

4 Claims, 3 Drawing Sheets

BACKLIGHT MODULE AND DISPLAY APPARATUS

CROSS REFERENCE TO RELATED APPLICATIONS

The present application is a 35 U.S.C. §371 National Phase conversion of International (PCT) Patent Application No. PCT/CN2011/076182, filed on Jun. 23, 2011, the disclosure of which is incorporated by reference herein. The PCT International Patent Application was filed in Chinese.

FIELD OF THE INVENTION

The present invention relates to a light-emitting diode (LED) driving circuit, and more particularly to an LED driving circuit used for a backlight module and a display apparatus.

BACKGROUND OF THE INVENTION

Liquid crystal displays (LCDs) have been widely applied in electrical products. Currently, most of LCDs are backlight type LCDs which comprise a liquid crystal panel and a backlight module. According to the position of the backlight source, the backlight module can be a side-light type or a direct-light type in order to provide LCDs with backlight.

Light emitting diodes (LEDs) have several beneficial characteristics, including low electrical power consumption, low heat generation, long operational life, small volume, good impact resistance, fast response and excellent stability for emitting color light with stable wavelengths. These characteristics have made the LEDs suitable for light sources of the backlight module.

Currently, in a normal boost circuit of an LED backlight module, a load terminal thereof needs a capacitor with high power density for discharging when an inductor is charged. Furthermore, when the quantity of the LEDs used in the LED backlight module is increased, and the load thereof is increased, considering the mechanical size or temperature thereof, a plurality of boost circuits are used to replace a single boost circuit for driving the LEDs of the backlight module.

However, normally, the capacitor with high power density is an electrolytic capacitor which has a limited life time, thus limiting the life time of the driving circuit of the backlight module. Moreover, when using the plurality of boost circuits, a plurality of boost IC chips are necessary, thus increasing the cost of the driving circuit of the backlight module.

As a result, it is necessary to provide an LED driving circuit, a backlight module and a display apparatus using the same to solve the problems existing in the conventional technologies, as described above.

SUMMARY OF THE INVENTION

The present invention provides a driving circuit, a backlight module and a display apparatus using the same to solve the problems existing in the conventional driving circuits.

A primary object of the present invention is to provide a driving circuit for driving a plurality of light-emitting diodes, and the driving circuit comprises: a first inductor connected between the light-emitting diodes and a power supply; a second inductor connected between the light-emitting diodes and the power supply; a first power switch connected between the first inductor and the light-emitting diodes; a second power switch connected between the second inductor and the light-emitting diodes; a driving circuit unit configured to output a driving signal which has a high level and a low level; and a push-pull circuit connected to the first power switch and the second power switch and configured to receive the driving signal with the high level or the low level, and to drive the first power switch and the second power switch to be alternately turned on according to the driving signal with the high level or the low level.

Another object of the present invention is to provide a backlight module, and the backlight module comprises: a back bezel; a plurality of light-emitting diodes disposed on the back bezel; and a driving circuit electrically connected to the light-emitting diodes for driving the light-emitting diodes, wherein the driving circuit comprises: a first inductor connected between the light-emitting diodes and a power supply; a second inductor connected between the light-emitting diodes and the power supply; a first power switch connected between the first inductor and the light-emitting diodes; a second power switch connected between the second inductor and the light-emitting diodes; a driving circuit unit configured to output a driving signal which has a high level and a low level; and a push-pull circuit connected to the first power switch and the second power switch and configured to receive the driving signal with the high level or the low level, and to drive the first power switch and the second power switch to be alternately turned on according to the driving signal with the high level or the low level.

A further object of the present invention is to provide a display apparatus, characterized in that: the display apparatus comprises: a display panel; and a backlight module comprising: a back bezel; a plurality of light-emitting diodes disposed on the back bezel; and a driving circuit electrically connected to the light-emitting diodes for driving the light-emitting diodes, wherein the driving circuit comprises: a first inductor connected between the light-emitting diodes and a power supply; a second inductor connected between the light-emitting diodes and the power supply; a first power switch connected between the first inductor and the light-emitting diodes; a second power switch connected between the second inductor and the light-emitting diodes; a driving circuit unit configured to output a driving signal which has a high level and a low level; and a push-pull circuit connected to the first power switch and the second power switch and configured to receive the driving signal with the high level or the low level, and to drive the first power switch and the second power switch to be alternately turned on according to the driving signal with the high level or the low level.

In one embodiment of the present invention, the first power switch is a p-channel metal-oxide-semiconductor (PMOS), and the second power switch is n-channel metal-oxide-semiconductor (NMOS).

In one embodiment of the present invention, the frequency adjusting module adjusts the operation frequency according to the phase detection signal.

In one embodiment of the present invention, the push-pull circuit comprises a first transistor and a second transistor, and a collector of the first transistor is connected to another power supply, and an emitter of the first transistor is connected to an emitter of the second transistor, and a base of the first transistor is connected to the driving circuit unit, and a collector of the second transistor is electrically connected to ground, and a base of the second transistor is connected to the driving circuit unit.

In one embodiment of the present invention, when the driving signal with the high level is provided to the push-pull circuit by the driving circuit unit, the first transistor is turned on, and the first power switch is turned on, and the second power switch is turned off; when the driving signal with the low level is provided to the push-pull circuit by the driving circuit unit, the first transistor is turned off, and the first power switch is turned off, and the second power switch is turned on.

In one embodiment of the present invention, the driving circuit unit is a driving integrated circuit chip.

With use of the driving circuit, the backlight module and the display apparatus using the same, an electrolytic capacitor or a capacitor having high capacitance can be omitted, thus enhancing the life time of the driving circuit. Furthermore, the quantity of boost circuits or IC chips is reduced by the driving circuit of the present invention for reducing a cost of circuit components.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
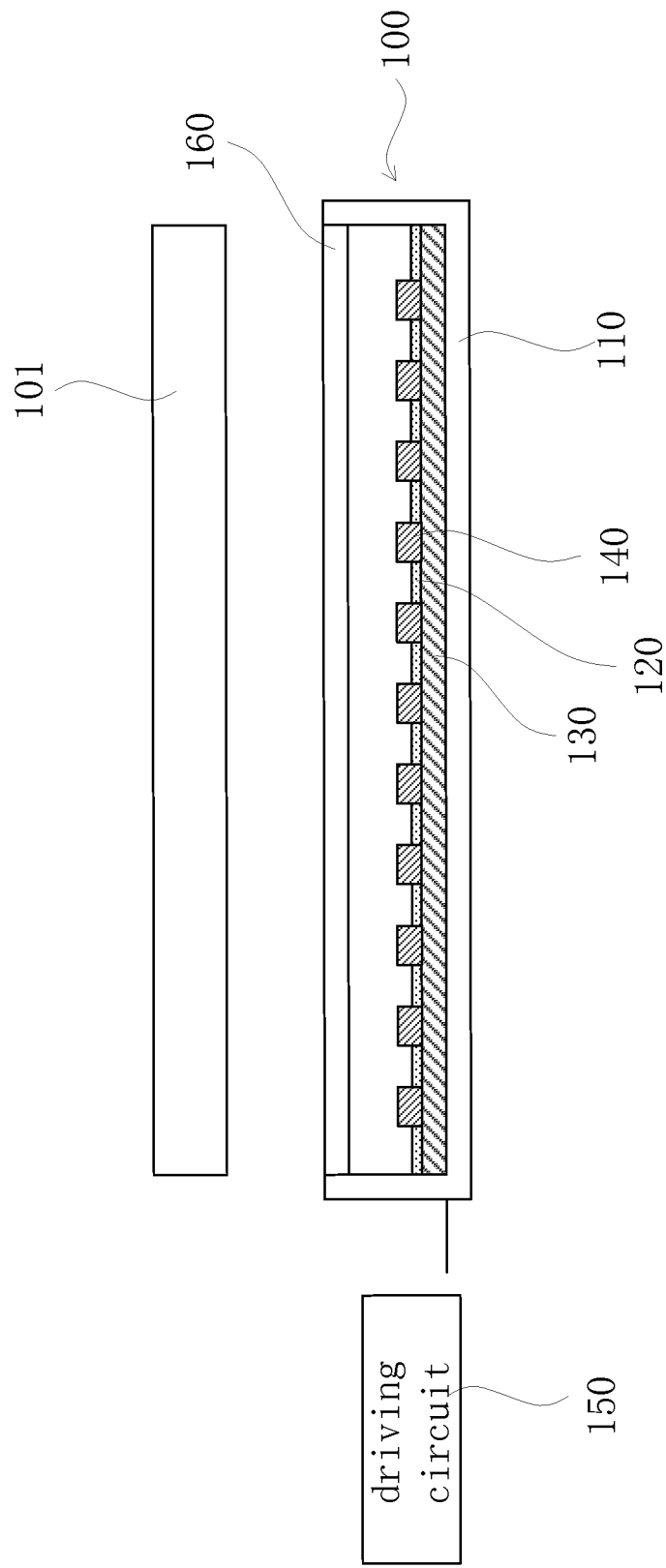
FIG. 1 is a cross-sectional view showing a backlight module and a display panel according to an embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing a backlight module and a display panel according to an embodiment of the present invention is illustrated. The driving circuit 150 of the present invention is used for a plurality of LEDs 120. The LEDs 120 can be connected in series as at least one LED strip, so as to act as a light source of the backlight module 100. The backlight module 100 may be realized as a side-light type backlight module or a direct-light type backlight module disposed opposite to a display panel 101 (such as an LCD panel), thereby forming a display apparatus (such an LCD apparatus). In this embodiment, the backlight module 100 may be the direct-light type backlight module which comprises a back bezel 110, the plurality of LEDs 120, a circuit board 130, a reflective layer 140, the driving circuit 150 and at least one optical film 160. The circuit board 130 is disposed on the back bezel 110. The LEDs 120 are disposed on the circuit board 130 and electrically connected thereto for emitting light to the display panel 101. The reflective layer 140 is formed around the LEDs 120 (such as formed on the circuit board 130 or the back bezel 110) for reflecting the light of the LEDs 120. The driving circuit 150 is electrically connected to LEDs 120 by the circuit board 130 for driving the LEDs 120 to emit light. The optical film 160 is disposed above the LEDs 120 for improving the light uniformity and light efficiency thereof.

Referring to FIG. 1 again, the back bezel 110 of the present embodiment may be made of an opaque material, such as plastic, metal or any combination material thereof for carrying the LEDs 120 and the circuit board 130. The LEDs 120 are disposed on the circuit board 130 and electrically connected to the driving circuit 150 through the circuit board 130. The circuit board 130 may be a printed circuit board (PCB) or a flexible printed circuit (FPC). The reflective layer 140 may be a reflective sheet, a reflective film or a reflective coated layer formed between or around the LEDs 120 for reflecting light. The reflective layer 140 may be made of a highly reflective material, such as Ag, Al, Au, Cr, Cu, In, Ir, Ni, Pt, Re, Rh, Sn, Ta, W, Mn, any alloy combination thereof, white reflective paint with etiolation-resistant and heat-resistant properties or any combination thereof for reflecting the light of the LEDs 120. The optical film 160 may be for example a diffuser, a prism sheet, a turning prism sheet, a brightness enhancement film, a dual brightness enhancement film, a diffused reflective polarizer film or any combination thereof disposed above the LEDs 120.

Figure 2:
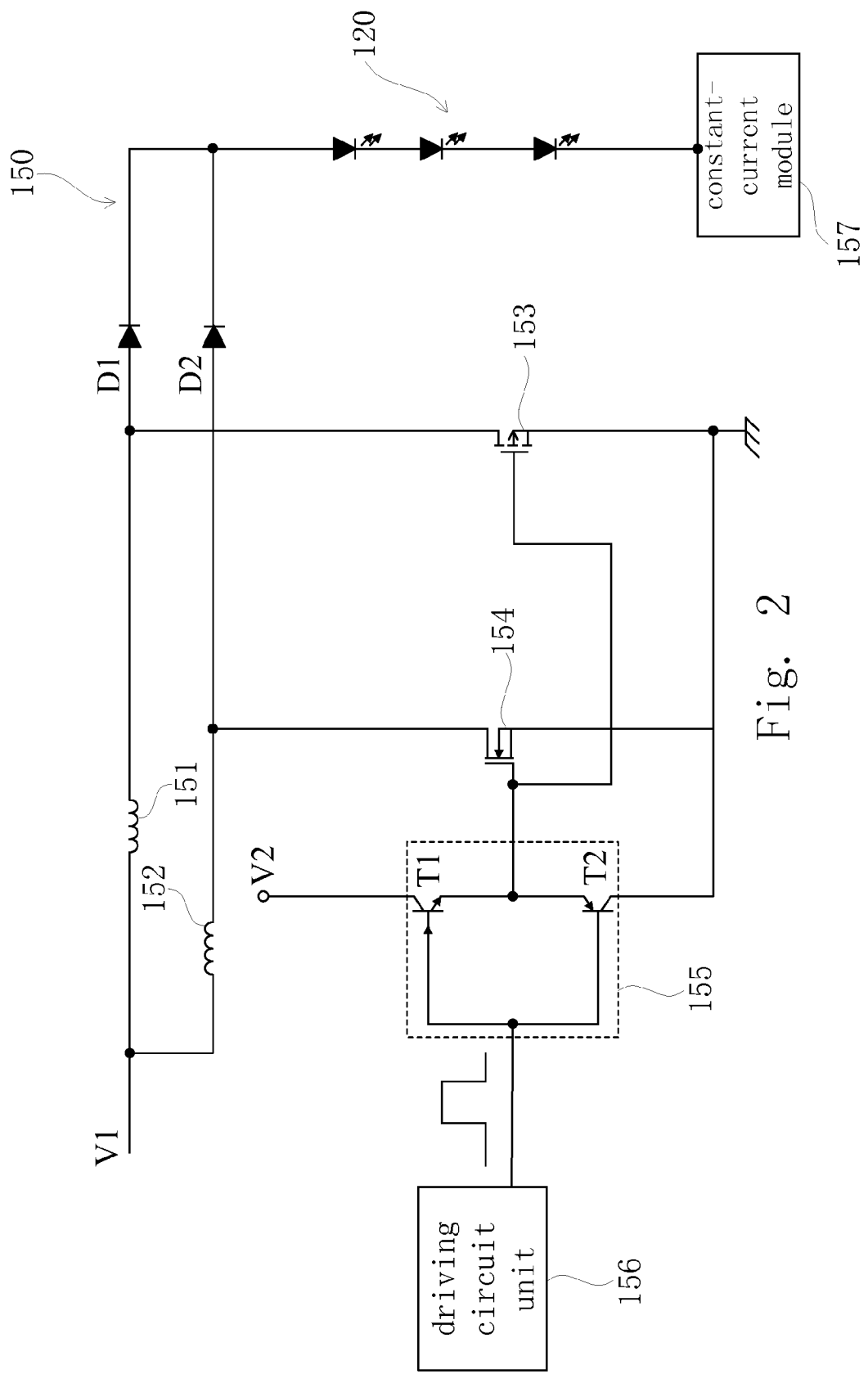
FIG. 2 is a circuit diagram showing the driving circuit according to an embodiment of the present invention.

Referring to FIG. 2 again, a circuit diagram showing the driving circuit according to an embodiment of the present invention is illustrated. The driving circuit 150 of the present embodiment may comprise a first inductor 151, a second inductor 152, a first power switch 153, a second power switch 154, a push-pull circuit 155, a driving circuit unit 156, a constant-current module 157 and diodes D1 and D2. The first inductor 151 is connected between the LEDs 120 and a power supply V1. The second inductor 152 is connected between the LEDs 120 and the power supply V1. The first power switch 153 is connected between the LEDs 120 and the first inductor 151. The second power switch 154 is connected between the LEDs 120 and the second inductor 152. The push-pull circuit 155 is connected between the first power switch 153 and the second power switch 154. The driving circuit unit 156 is connected to the push-pull circuit 155 and configured to output a driving signal to the push-pull circuit 155, wherein the driving signal has a high level and a low level. The push-pull circuit 155 can receive the high level or low level signal inputted by the driving circuit unit 156, and drive the first power switch 153 and the second power switch 154 to be alternately turned on according to the driving signal with the high level or the low level. The constant-current module 157 is connected to the LEDs 120 in series for stabilizing a current of the LEDs 120 such that the LEDs 120 can have a constant current. The diode D1 is connected between the first inductor 151 and the LEDs 120, and the diode D2 is connected between the second inductor 152 and the LEDs 120.

Referring to FIG. 2 again, the first power switch 153 of the present embodiment may be an enhancement mode p-channel metal-oxide-semiconductor (PMOS) transistor, and a drain thereof is connected between the first inductor 151 and the diode D1, and a source thereof is electrically connected to ground, and a gate thereof is connected to the push-pull circuit 155. The second power switch 154 of the present embodiment may be a depletion mode n-channel metal-oxide-semiconductor (NMOS) transistor, and a drain thereof is connected between the second inductor 151 and the diode D2, and a source thereof is electrically connected to ground, and a gate thereof is connected to the push-pull circuit 155.

Referring to FIG. 2 again, the push-pull circuit 155 of the present embodiment can comprise a first transistor T1 and a second transistor T2. A collector of the first transistor T1 is connected to another power supply V2. An emitter of the first transistor T1 is connected to an emitter of the second transistor T2. A base of the first transistor T1 is connected to the driving circuit unit 156. A collector of the second transistor T2 is electrically connected to ground. An emitter of the second transistor T2 is connected to the emitter of the first transistor T1. A base of the second transistor T2 is connected to the driving circuit unit 156.

Referring to FIG. 2 again, the driving circuit unit 156 may be a driving integrated circuit (IC) chip for providing the driving signal (such as a voltage signal) with different levels to the push-pull circuit 155. When the driving signal with the high level is provided to the push-pull circuit 155 by the driving circuit unit 156, the first transistor T1 is turned on, and the first power switch 153 is turned on, and the second power switch 154 is turned off. At this time, the first inductor 151 can be in a discharging state, and the second inductor 152 can be in a charging state. In contrast, when the driving signal with the low level is provided to the push-pull circuit 155 by the driving circuit unit 156, the first transistor T1 is turned off, and the first power switch 153 is turned off, and the second power switch 154 is turned on. At this time, the first inductor 151 can be in the charging state, and the second inductor 152 can be in the discharging state.

Therefore, by using the push-pull circuit 155, the driving circuit 150 of the present invention can drive the first power switch 153 and the second power switch 154 be alternately turned on, so as to continuously allow the first inductor 151 or the second inductor 152 being the discharging state for the LEDs 120. Accordingly, when the driving circuit 150 outputs the driving signal with the high or low level, the first inductor 151 or the second inductor 152 can continuously provide current to the LEDs 120 at the load terminal without using an electrolytic capacitor or a capacitor having high capacitance in the driving circuit, thereby enhancing the life time of the driving circuit. Moreover, the driving effect achieved by the driving circuit 150 of the present invention can be similar to a driving circuit using a plurality of boost circuits or IC chips. Thus, the quantity of the boost circuits or IC chips is reduced by the driving circuit 150 of the present invention for reducing a cost of circuit components.

Figure 3:
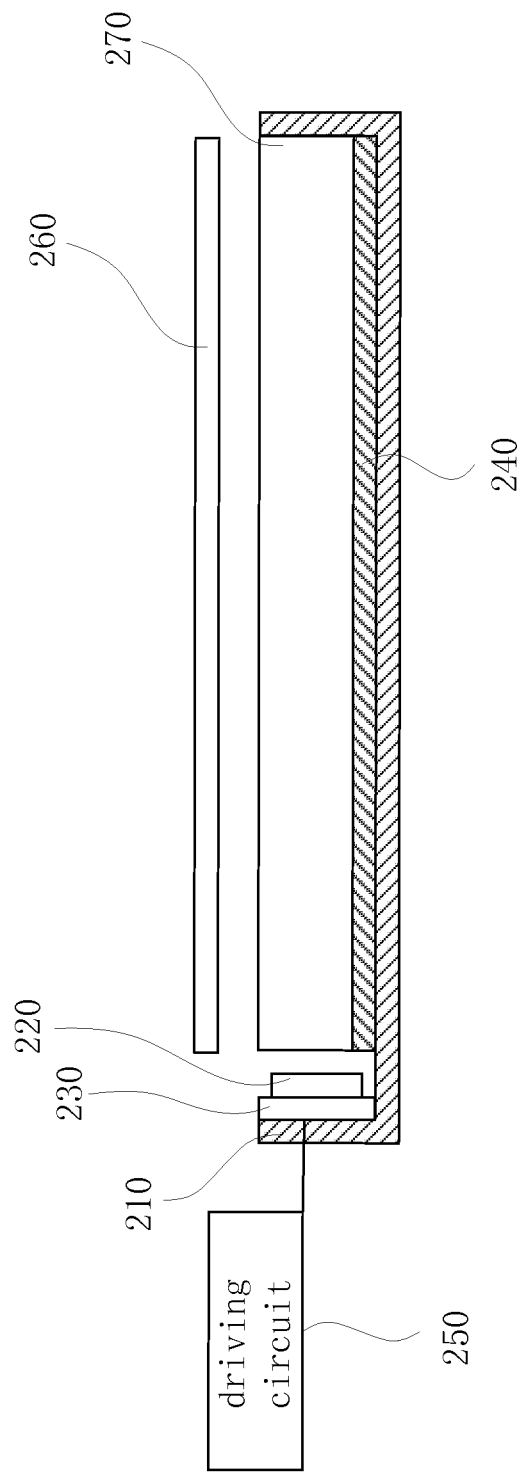
FIG. 3 is a cross-sectional view showing a backlight module according to another embodiment of the present invention.

Referring to FIG. 3, a cross-sectional view showing a backlight module according to another embodiment of the present invention is illustrated. In another embodiment, the driving circuit 250 can be also used for a side-light type backlight module. At this time, the backlight module 200 may comprise a back bezel 210, a plurality of LEDs 220, a circuit board 230, a reflective layer 240, the driving circuit 250, at least one optical film 260 and a light guide plate 270. The light guide plate 270 is disposed on the back bezel 210. The LEDs 220 are disposed on the circuit board 230 to form a light bar which can be disposed at one side of the light guide plate 270 to emit light thereto, and the light is guided to be outputted by the light guide plate 270. The driving circuit 250 is electrically connected to LEDs 220 by the circuit board 230 for driving the LEDs 220.

As described above, the driving circuit, the backlight module and the display apparatus using the same can use a push-pull circuit to replace the electrolytic capacitor or the capacitor having high capacitance for enhancing the life time of the driving circuit. Furthermore, the quantity of boost chips is reduced by the driving circuit of the present invention for reducing a cost of circuit components.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, wherein the backlight module comprises:
   a back bezel;
   a plurality of light-emitting diodes disposed on the back bezel; and
   a driving circuit electrically connected to the light-emitting diodes for driving the light-emitting diodes, wherein the driving circuit comprises:
      a first inductor connected between the light-emitting diodes and a power supply;
      a second inductor connected between the light-emitting diodes and the power supply;
      a p-channel metal-oxide-semiconductor (PMOS) transistor connected between the first inductor and the light-emitting diodes;
      an n-channel metal-oxide-semiconductor (NMOS) transistor connected between the second inductor and the light-emitting diodes;
      a driving circuit unit configured to output a driving signal which has a high level and a low level; and
      a push-pull circuit connected to a gate of the PMOS transistor and a gate of the NMOS transistor and configured to receive the driving signal with the high level or the low level, and to drive the PMOS transistor and the NMOS transistor to be alternately turned on according to the driving signal with the high level or the low level, wherein the push-pull circuit comprises a first transistor and a second transistor, and a collector of the first transistor is directly connected to another power supply, and an emitter of the first transistor is connected to an emitter of the second transistor, and a base of the first transistor is connected to the driving circuit unit, and a collector of the second transistor is electrically connected to ground, and a base of the second transistor is connected to the driving circuit unit;
   wherein, when the driving signal with the high level is provided to the push-pull circuit, the first transistor is turned on, and the PMOS transistor is turned on, and the NMOS transistor is turned off, and at this time, the first inductor is in a discharging state, and the second inductor is in a charging state;
   wherein, when the driving signal with the low level is provided to the push-pull circuit, the first transistor is turned off, and the PMOS transistor is turned off, and the NMOS transistor is turned on, and at this time, the first inductor is in the charging state, and the second inductor is in the discharging state.

2. The backlight module according to claim 1, wherein the driving circuit unit is a driving integrated circuit chip.

3. A backlight module, wherein the backlight module comprises:
   a back bezel;
   a plurality of light-emitting diodes disposed on the back bezel; and
   a driving circuit electrically connected to the light-emitting diodes for driving the light-emitting diodes, wherein the driving circuit comprises:
      a first inductor connected between the light-emitting diodes and a power supply;
      a second inductor connected between the light-emitting diodes and the power supply;

a first power switch connected between the first inductor and the light-emitting diodes;

a second power switch connected between the second inductor and the light-emitting diodes;

a driving circuit unit configured to output a driving signal which has a high level and a low level; and a push-pull circuit connected to a gate of the first power switch and a gate of the second power switch and configured to receive the driving signal with the high level or the low level, and to drive the first power switch and the second power switch to be alternately turned on according to the driving signal with the high level or the low level, wherein the push-pull circuit comprises a first transistor and a second transistor, and a collector of the first transistor is directly connected to another power supply, and an emitter of the first transistor is connected to an emitter of the second transistor, and a base of the first transistor is connected to the driving circuit unit, and a collector of the second transistor is electrically connected to ground, and a base of the second transistor is connected to the driving circuit unit;

wherein, when the driving signal with the high level is provided to the push-pull circuit, the first transistor is turned on, and the first power switch is turned on, and the second power switch is turned off, and at this time, the first inductor is in a discharging state, and the second inductor is in a charging state;

wherein, when the driving signal with the low level is provided to the push-pull circuit, the first transistor is turned off, and the first power switch is turned off, and the second power switch is turned on, and at this time, the first inductor is in the charging state, and the second inductor is in the discharging state.

4. A display apparatus, wherein the display apparatus comprises:

a display panel; and a backlight module comprising:

a back bezel; a plurality of light-emitting diodes disposed on the back bezel; and a driving circuit electrically connected to the light-emitting diodes for driving the light-emitting diodes, wherein the driving circuit comprises:

a first inductor connected between the light-emitting diodes and a power supply;

a second inductor connected between the light-emitting diodes and the power supply;

a first power switch connected between the first inductor and the light-emitting diodes;

a second power switch connected between the second inductor and the light-emitting diodes;

a driving circuit unit configured to output a driving signal which has a high level and a low level; and a push-pull circuit connected to a gate of the first power switch and a gate of the second power switch and configured to receive the driving signal with the high level or the low level, and to drive the first power switch and the second power switch to be alternately turned on according to the driving signal with the high level or the low level wherein the push-pull circuit comprises a first transistor and a second transistor, and a collector of the first transistor is directly connected to another power supply, and an emitter of the first transistor is connected to an emitter of the second transistor, and a base of the first transistor is connected to the driving circuit unit, and a collector of the second transistor is electrically connected to ground, and a base of the second transistor is connected to the driving circuit unit;

wherein, when the driving signal with the high level is provided to the push-pull circuit, the first transistor is turned on, and the first power switch is turned on, and the second power switch is turned off, and at this time, the first inductor is in a discharging state, and the second inductor is in a charging state;

wherein, when the driving signal with the low level is provided to the push-pull circuit, the first transistor is turned off, and the first power switch is turned off, and the second power switch is turned on, and at this time, the first inductor is in the charging state, and the second inductor is in the discharging state.

* * * * *